United States Patent
Heuer

(10) Patent No.: US 7,586,921 B2
(45) Date of Patent: Sep. 8, 2009

(54) METHOD OF TRANSMITTING SYNCHRONOUS TRANSPORT MODULES VIA A SYNCHRONOUS TRANSPORT NETWORK

(75) Inventor: Volkmar Heuer, Ditzingen (DE)

(73) Assignee: ALCATEL, Paris (FR)

( * ) Notice: Subject to any disclaimer, the term of this patent is extended or adjusted under 35 U.S.C. 154(b) by 1874 days.

(21) Appl. No.: 09/863,321

(22) Filed: May 24, 2001

(65) Prior Publication Data

US 2002/0001308 A1    Jan. 3, 2002

(30) Foreign Application Priority Data

May 26, 2000    (EP)    ................... 00440160

(51) Int. Cl.
 H04L 12/56    (2006.01)
 H04J 3/04    (2006.01)
(52) U.S. Cl. .................... 370/395.51; 370/535; 370/907
(58) Field of Classification Search ............ 370/395.51, 370/535–544, 907; 398/43, 83
See application file for complete search history.

(56) References Cited

U.S. PATENT DOCUMENTS

| | | | |
|---|---|---|---|
| 5,666,351 A * | 9/1997 | Oksanen et al. | 370/474 |
| 6,477,178 B1 * | 11/2002 | Wakim et al. | 370/466 |
| 6,496,519 B1 * | 12/2002 | Russell et al. | 370/465 |
| 6,700,900 B1 * | 3/2004 | Turban | 370/465 |
| 6,842,455 B1 * | 1/2005 | Heuer | 370/393 |
| 6,842,787 B2 * | 1/2005 | Stadler et al. | 709/231 |

FOREIGN PATENT DOCUMENTS

| | | |
|---|---|---|
| EP | 874488 A2 * | 10/1998 |
| EP | 0 901 306 A2 | 3/1999 |
| EP | 993135 A2 * | 4/2000 |
| EP | 1253734 A2 * | 10/2002 |

OTHER PUBLICATIONS

N. Jones et al, "A Proposal for SONET Standards on Virtual Concatenation of High Order and Low Order SPE's" Contribution to TI Standards Project, Online Jan. 17-21, a2000 pp. 1-12, XP002150418.
ITU-T Recommendation G.707 dated Mar. 1996,—Series G: Transmission Systems and Media—Digital transmission systems—Terminal equipments—General—Network node interface for the synchronous digital hierarchy (SDH), pp. 6-17.
ITU-T Recommendation G.841 dated Oct. 1998, Series G: Transmission Systems and Media, Digital Systems and Networks—Types and Characteristics of SDH Network Protection Architectures.
ITU—#48R1 (PLEN) dated Apr. 3-14, 2000,—Draft Revised Recommendation G.707/Y.1322.
ITU-T No. G.707 dated Mar. 1996, Series G; Transmission Systems and Media—Digital transmission systems—Terminal equipments—General—Network node interface for the synchronous digital hierarchy (SDH).

* cited by examiner

Primary Examiner—Tri H Phan
(74) Attorney, Agent, or Firm—Sughrue Mion, PLLC

(57) ABSTRACT

Network elements of a first synchronous transport network are to be connected to one another via a second synchronous transport network. For this purpose a frame (STM-4) to be transmitted, including the unchanged overhead sections (MS-OH, RS-OH, AU-PTR) thereof, is packed as payload in a concatenation (VC-4-5v) of newly formed multiplex units (VC-4v) and transmitted in newly formed transport modules via the second transport network.

10 Claims, 5 Drawing Sheets

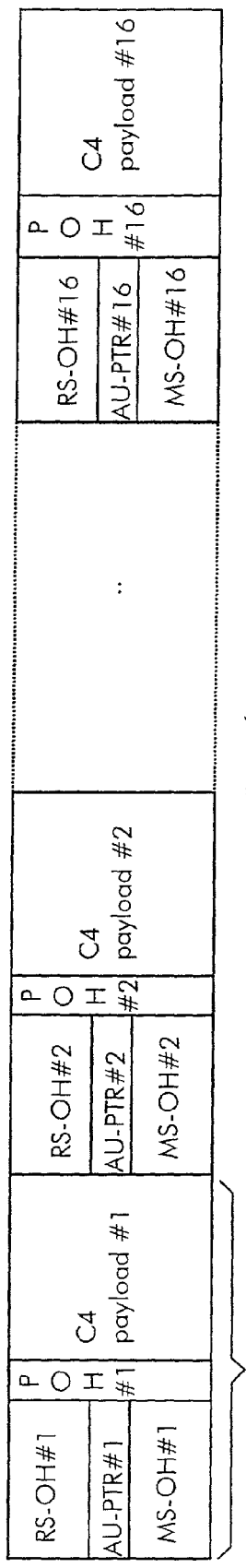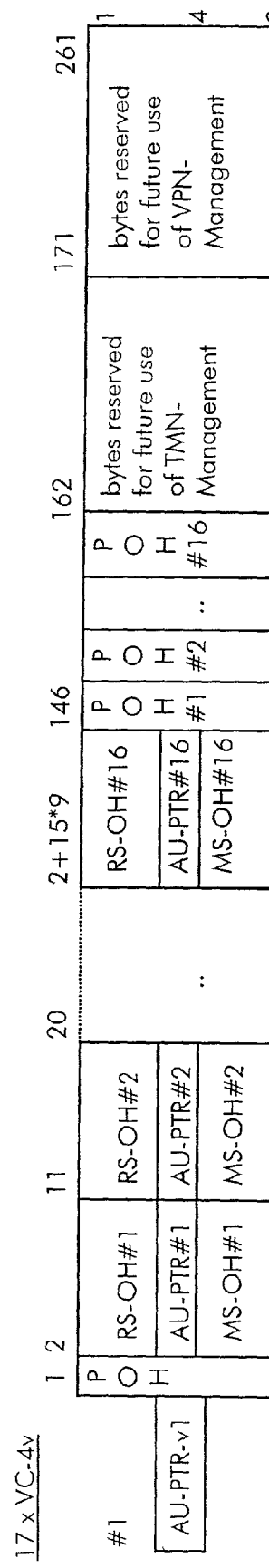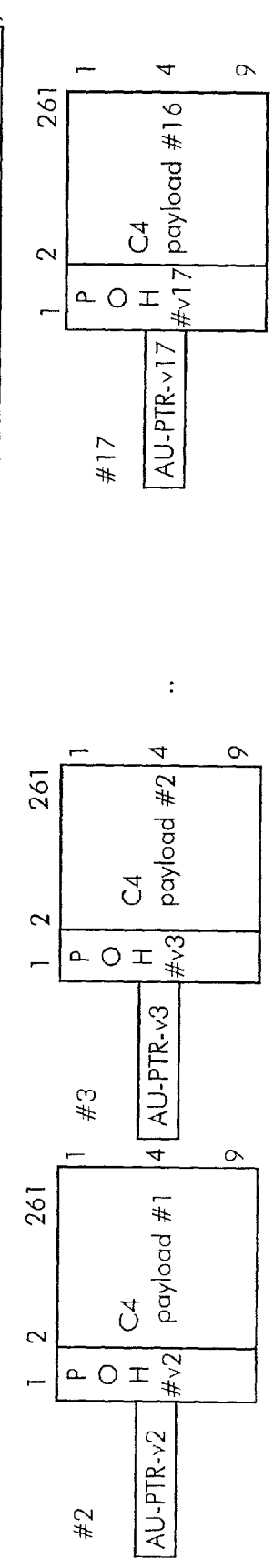
Fig. 5a
Fig. 5b

METHOD OF TRANSMITTING SYNCHRONOUS TRANSPORT MODULES VIA A SYNCHRONOUS TRANSPORT NETWORK

This application is based on and claims the benefit of European Patent Application No. 00440160.0 filed Mai 26, 2000, which is incorporated by reference herein.

FIELD OF THE INVENTION

The invention relates to a method of transmitting, via a synchronous transport network, a frame-structured synchronous multiplex signal, being composed of transport frames having a payload section and an overhead section, in the payload section of which multiplex units are multiplexed in accordance with a multiplex hierarchy, and to a multiplexer for a synchronous transport network which is adapted to transmit a frame-structured, synchronous multiplex signal of this type.

BACKGROUND OF THE INVENTION

A synchronous digital transport network operates for example in accordance with the recommendations of the ITU-T (Telecommunication Standardization Sector of International Telecommunication Union) for SDH (Synchronous Digital Hierarchy) or SONET (Synchronous Optical Network), useful information being packed in so-called containers. The containers contain an overhead section known as "path overhead" together with which they are referred to as virtual containers VC-N. There are virtual containers of the types VC-11, VC-12, VC-2, VC-3 and VC-4. There are also contiguously concatenated containers of the types VC-4-4c and VC-4-16c in the case of SDH, and VC-3-3c, VC-3-12c and VC-3-48c in the case of SONET. The virtual containers represent multiplex units and are multiplexed in a frame referred to as synchronous transport module STM-N (N-1, 4, 16 or 64), the virtual containers being able to be arbitrarily positioned in the payload section of the transport modules and addressed by a pointer in the overhead section of the transport modules. Smaller virtual containers here are always multiplexed in larger virtual containers. A synchronous transport module in SDH for example always comprises a virtual container VC-4, or in the case of contiguously concatenated containers, a VC-4-nc (n=4 or 16). On the other hand, in the case of SONET each transport module always contains three VC-3s, and in the case of contiguously concatenated containers a VC-3-3c, which corresponds to a VC-4, a VC-3-12c or a VC-3-48c. The described multiplex hierarchy of SDH and SONET is described in detail in ITU-T G.707 (3/96) Chapter 6.

Communications signals transmitted in a synchronous transport network of this kind are thus frame-structured, synchronous multiplex signals being composed of frames each having a payload section and an overhead section. Multiplex units are multiplexed in the payload section of each transport frame in accordance with the multiplex hierarchy specified by the ITU-T. The overhead section contains a pointer to the largest multiplex unit contained in the payload section and one section referred to as RSOH (regenerator section overhead) and one section referred to as MSOH (multiplex section overhead). These contain items of check- and control information which in the case of the RSOH are terminated and regenerated by each regenerator and in the case of the MSOH by each multiplexer. Amongst other things, management functions of the network management system are performed with the aid of these items of check-and control information. Increasingly, synchronous transport networks are being used not only by public network operators but also as company networks with company network management systems. If a plurality of SDH- or SONET-based sub-networks of a company network are to be connected via the transport network of a public operator, different use of the check- and control information from RSOH and MSOH can lead to conflicts between the network management systems of company transport network and public transport network. Agreements on a uniform use of the check- and control information are necessary and the network management system of the company transport network is restricted with regard to the management of its company network. Thus for example the multiplex structure cannot be changed from 16×VC-4 to 1×VC-4-16c in a STM-16 without the agreement of the public network operator.

Optical networks via which so-called optical channels (OCh) are to be transmitted are also currently in development. These networks are to be capable of transparently transmitting signals with any bit rate and therefore these future optical networks will also be capable of transparently transporting frame-structured communications signals from a company network. However as yet no binding standard exists for this purpose and moreover the construction of such an optical network would require the replacement of all the network elements.

SUMMARY OF THE INVENTION

An object of the invention is to provide a method with which it is possible to use the current SDH- or SONET-based transport networks to connect synchronous digital sub-networks of private operators without the need for agreements between the network management systems and without restrictions upon the private operator. Another objective of the invention is to provide a multiplexer for a synchronous transport network with which frame-structured synchronous multiplex signals, being composed of frames having a payload section and an overhead section in the payload sections of which multiplex units are multiplexed in accordance with a multiplex hierarchy, can be transmitted without the need to access the overhead section of the transport frames to be transmitted.

The object is achieved by mapping the frames to be transmitted, including their unchanged overhead sections, as payload in a concatenation of newly formed multiplex units.

With respect to the multiplexer, this object is achieved by a multiplexer for a synchronous digital transport network, which has at least one tributary input, a multiplex device, and at least one output. The tributary input receives a first frame-structured synchronous multiplex signal which is composed of first frames each having a payload section and an overhead section. The multiplex units are multiplexed in the payload sections in accordance with a multiplex hierarchy. The multiplex device is connected to the tributary input. It serves to create new multiplex units, to concatenate the newly formed multiplex units to form a concatenation, and to pack the received transport frames, including the unchanged overhead sections thereof, as payload in the concatenation of the newly formed multiplex units. The one output creates and transmits a second, frame-structured synchronous multiplex signal composed of second frames in whose payload sections the concatenated, newly formed multiplex units are inserted.

An advantage of the invention is that it facilitates the construction of SDH- or SONET-based virtual private networks (VPN). Other advantages are that it is also possible to transmit frame-structured synchronous communications signals in the case of which overhead bytes are used proprietarily, i.e. not in accordance with the ITU-T recommendations, that RSOH, MSOH and pointer values remain in the overhead section of the transport frames to be transmitted, and that therefore in the transmission of such frame-structured synchronous communications signals the same effect is achieved as would be achieved with the planned optical networks but without the need to replace the existing network elements in the public transport network.

Another advantage of the invention consists in that the private network operator can set up protection circuits, such as MSP (Multiplex Section Protection, ITU-T G.841, 10/1998, Section 7.1) or MS-SPRING (Multiplex Section Shared Protection Ring, ITU-T G.841, 10/1998, Section 7.2) between its sub-networks.

The invention can also be used advantageously for the switching of frame-structured communications signals within a network element.

BRIEF DESCRIPTION OF THE DRAWINGS

In the following the invention will be described in several exemplary embodiments making reference to FIGS. 1 to 8 in which.

DETAILED DESCRIPTION OF THE INVENTION

Figure 1:
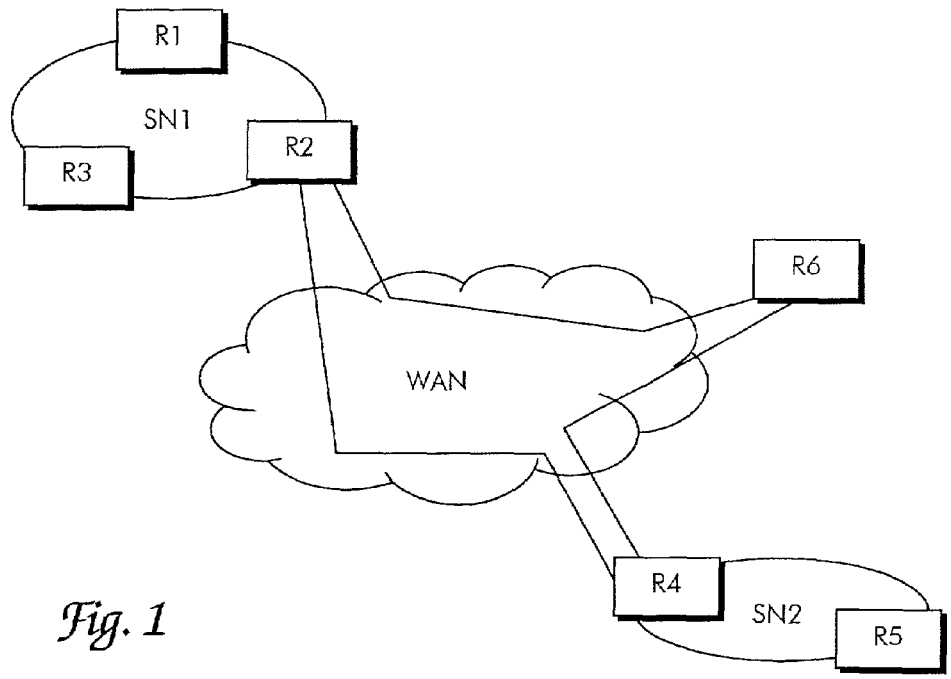
FIG. 1 illustrates sub-networks of a private network operator which connects its sub-networks via a public transport network.

FIG. 1 shows an application of the invention as first exemplary embodiment. Two sub-networks SN1 and SN2 and one individual network element R6 of a private operator are connected to one another via a public transport network WAN. The first sub-network SN1 contains three network elements R1, R2 and R3 which are connected to form a ring network. The second sub-network SN2 contains two network elements R4 and R5 which are connected to one another via two redundant lines. The network elements are interconnected within the sub-networks SN1, SN2 via SDH interfaces via which the frame-structured synchronous multiplex signals are transmitted. The multiplex signals consist of synchronous transport modules of the type STM-4.

Each of the network elements R1-R6 is an IP router in each case of a data network via which a plurality of IP-capable terminals of the operator are interlinked. The SDH-connections within the sub-networks represent the operator's backbone network via which the IP-traffic between the data networks is handled for example by means of the method for "IP via SDH" known from IETF RFC 1619 and 1661.

The sub-networks SN1, SN2 and the individual router R6 are now likewise to be capable of exchanging transport modules of the type STM-4 via the transport network WAN in order that the sub-networks are connected to one another. For this purpose it is necessary for the transport modules to be transmitted unchanged between the sub-networks, i.e. without terminating the overhead of the transport modules in the transport network WAN, so that the operator's backbone network is not subject to any restrictions regarding the use of the overhead bytes.

A basic principle of the invention is now to transmit the synchronous transport modules in transparent fashion as payload in a concatenation of virtual containers. For this purpose new multiplex units of the type VC-4 are formed in the transport network and concatenated with one another to form a virtual concatenation VC-4-nv. The transport frames to be transmitted between the sub-networks are packed as payload into the payload sections of the multiplex units of this virtual concatenation. The newly formed multiplex units are then embedded in the payload section of newly formed transport modules and transmitted via the transport network WAN.

Figure 2:
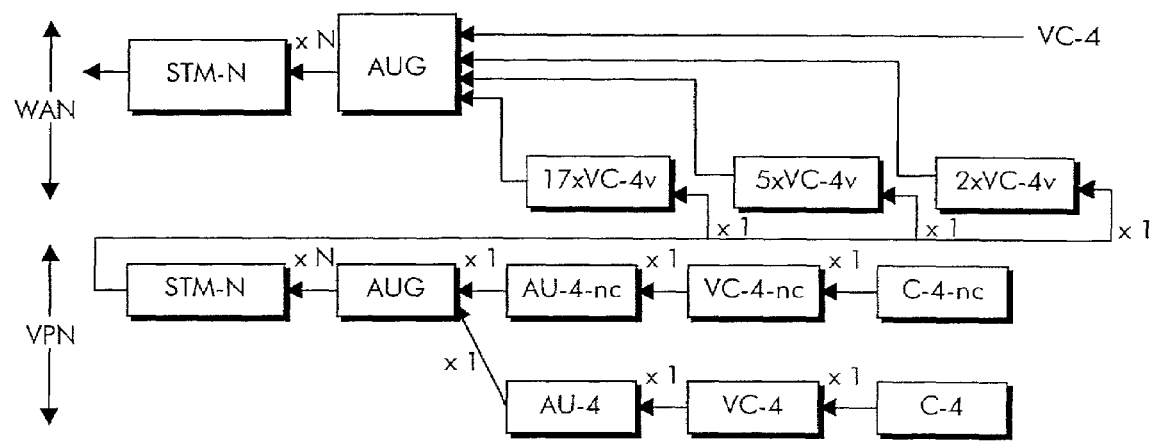
FIG. 2 illustrates the multiplex structure for the process according to the invention for a SDH-based transport network.

The mapping illustrated in FIG. 2 is used for this purpose. FIG. 2 shows a container C-4 which, by the addition of an overhead section known as POH (path overhead), is extended to form a virtual container VC-4. The container C-4 contains data of a payload signal which are to be transmitted. The virtual container VC-4 represents the multiplex unit. By the addition of a pointer indicating the phase position of the virtual container VC-4 in a superordinate transport frame, the VC-4 becomes a so-called AUG (administrative unit group).

Alternatively, as shown in the second from bottom line of the Figure, an AUG can also contain a container of a contiguous concatenation C-4-nc. Such contiguous concatenations are used when, in a transport module STM-N (N=4, 16 or 64) which is greater than a STM-1, the payload sections of the containers C-4 contained therein are to be jointly used for one single transmission channel. At this point it should also be noted that the nomenclature of the draft version of ITU-T G.707 (Temporary Document 48R1 (PLEN), 4/00), currently discussed in ITU-T SG15, differentiates the AUG into AUGN (N=1, 4, 16) corresponding to the size of the transport module in which the AUG is transported. Accordingly a STM-16 always contains an AUG16. This AUG16 can contain either a contiguous concatenation of 16 VC-4s (VC-4-16c) or however four byte-wise interleaved AUG4s. The AUG4s can in turn contain either a contiguous concatenation VC-4-4c or four type-wise interleaved AUG1s.

In a next step a transport frame STM-N is formed, where N can be 1, 4, 16 or 64. For N=1, as already mentioned, the transport frame contains an overhead section comprising SOH, RSOH and pointer, and a payload section. The payload section comprises exactly one AUG1 and the pointer addresses the start of the VC-4 in the payload section. higher transport frames (N=4, 16, 64) are formed by byte-wise interleaving of N AUG1s to form AUGN. A STM-N thus contains exactly one AUGN which in turn contains exactly N AUG1s in accordance with the described multiplex rule. The manner in which the AUGs are interleaved in the STM-N is described in detail in the draft version of ITU-T G.707 (Temporary Document 48R1 (PLEN), 4/00 Chpt. 7.1.

The thus formed transport frame STM-N is now periodically repeated with a frame clock, where each new frame naturally contains new data bits of the payload signal to be transmitted. The synchronous data stream formed from the periodically repeated transport frames is transmitted in the sub-networks of the private operator and transports all the payload data, i.e. in the exemplary embodiment the IP packets, which are transmitted between the individual routers in the operator's backbone network. This data stream is now also to be transmitted as a whole via the public transport network WAN in order to connect the sub-networks SN1, SN2 and the individual router R6 to form a whole network.

For this purpose, at the interface between public transport network and private company network new multiplex units VC-4 are generated by the multiplexer and concatenated to form a virtual concatenation VC-4v. Such a virtual concatenation of virtual containers VC-4 is known per se and described in ITU-T G.707 Chpt. 8.1.7. The number of multiplex units in the concatenation is dependent upon the size of the transport module to be transmitted. If, as in the exemplary embodiment, a STM-4 is to be transmitted, the public network operator requires five multiplex units of the type VC-4. Two VC-4s would be required for STM-1, seventeen VC-4s for STM-16 and sixty eight VC-4s for STM-64. In the mapping shown in FIG. 2 this is schematically indicated by parallel paths in the flow diagram. The virtual containers VC-4 of the concatenation are now combined to form a new AUG in accordance with the above described multiplex rule. As is known, a STM-N can accommodate exactly N VC-4s. As the number of concatenated containers (2, 5, 17 or 68) does not correspond to the permissible values for N (1, 4, 16, 64), the next larger transport frame must be used. The remaining capacity of the transport frame can be filled with further multiplex units VC-4. This is illustrated in FIG. 2 by a further tributary for the upper AUG.

As this is a virtual concatenation, alternatively to a next larger transport frame it is also possible to use several smaller transport frames. The individual multiplex units of the virtual concatenation thus need not necessarily be transmitted via the same interface but can also take different paths through the transmission network, transit time differences being compensated by intermediate storage in the receiving network element. However it is advantageous to transmit the virtual concatenation in one single transport module as this minimizes the transit time differences.

Figure 3:
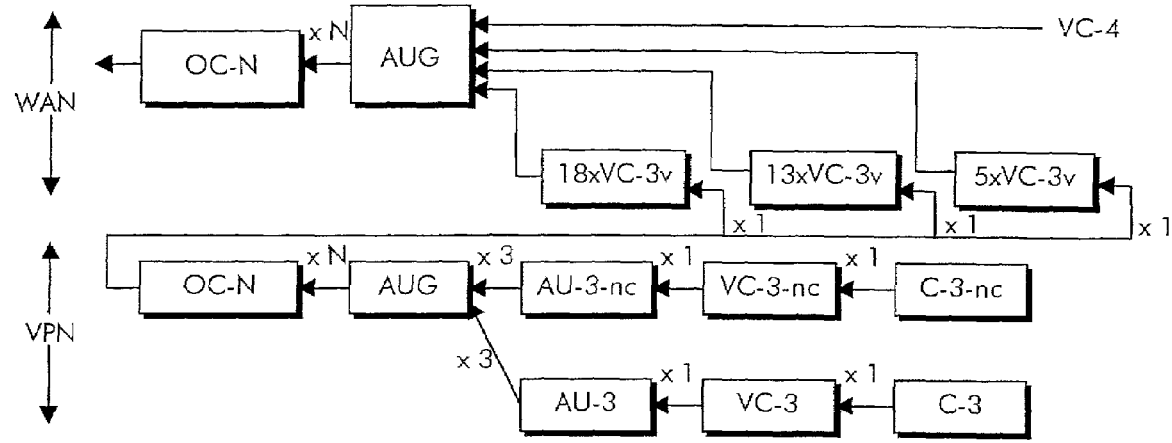
FIG. 3 illustrates the multiplex structure for the process according to the invention for a SONET-based transport network, FIG. 4a, b illustrate a first example for the mapping of frames of the type STM-4 in a SDH-based transport network, FIG. 5a, b illustrate a second example for the mapping of frames of the type STM-16.

Now a new transport frame STM-N is formed and the AUG is embedded in the payload section of this new transport frame. The periodic repetition of this transport frame always with a new payload gives rise to a new synchronous data stream which is transmitted via the transport network WAN of the public operator. In the transmission the overhead of the newly formed transport frames is exclusively available for control and management functions of the public transport network. In accordance with the ITU-T recommendations the public operator can access the overhead bytes with no further restrictions without conflicting with the network management system of the private operator, as the transport frames formed by its network elements, together with overhead, are transported as payload through the public transport network. FIG. 3 illustrates the corresponding mapping for a SONET-based transport network. Instead of a VC-4, in SONET one always uses three VC-3s which are combined to form an AUG.

In SONET the transport modules are known not as STM-N but as OC-N (optical) or STS-N (electrical) where N=3, 12, 48 or 192. Similarly to a STM-N, they also contain a RSOH and a MSOH in the overhead section. However they include not only one pointer, but, in accordance with the number of multiplex units of the highest hierarchy stage (VC-3), three pointers to the three VC-3s of the AUG. The number of virtual containers VC-3-Xv for the transport modules OC-3, OC-12 and OC-48 which are to be virtually concatenated for the transport is shown in the Figure.

In addition to the mappings illustrated in FIGS. 2 and 3, mixed forms are also possible, in the case of which for example the private operator runs a SONET-based network and connects its sub-networks via a SDH-based transport network of the public operator.

Figure 4A:
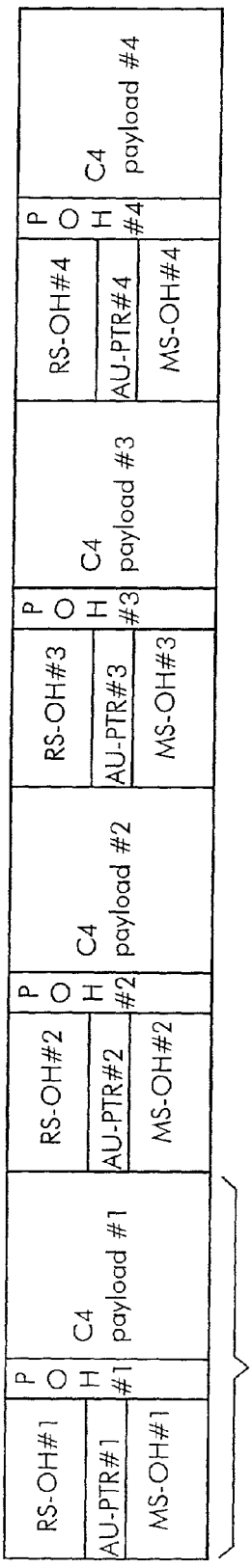
Figure 4B:
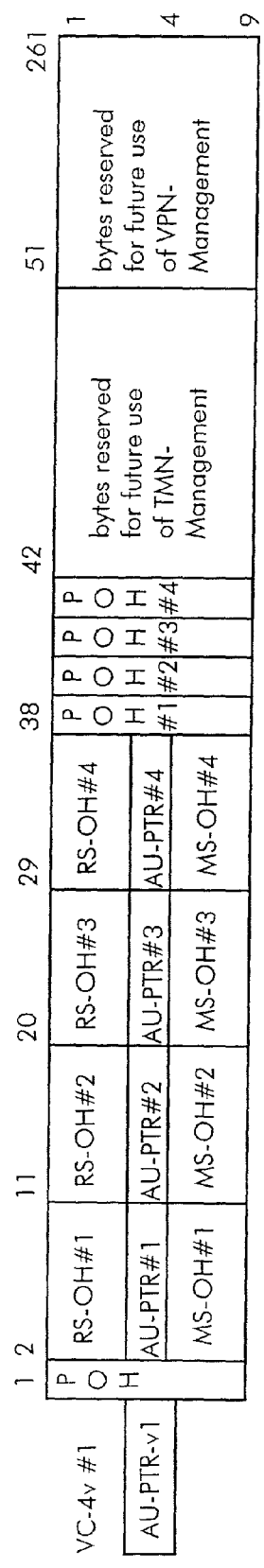
Figure 4B:
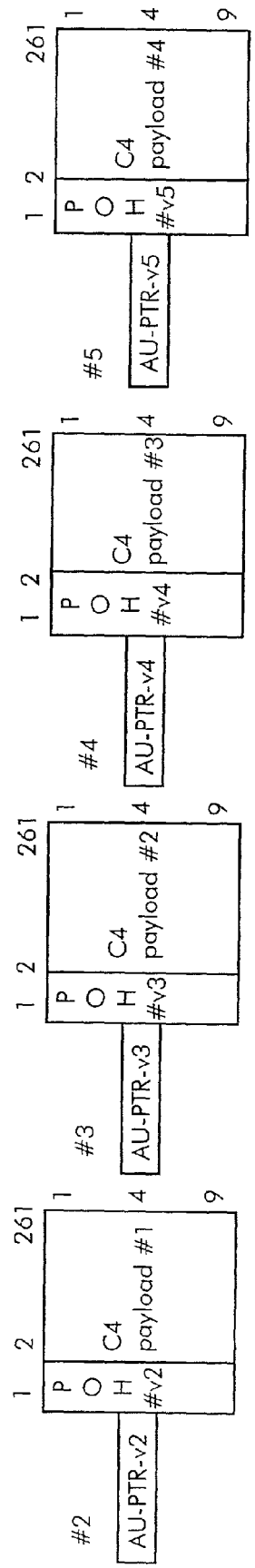

FIGS. 4a and 4b schematically illustrate how in the first exemplary embodiment the transport frames from the private network which are to be transported are embedded in the public operator's concatenated multiplex units which are to be newly formed. FIG. 4a firstly shows the construction of the STM-4 of the private operator. The construction corresponds to the specifications of ITU-T G.707. The STM-4 has one single overhead section with a length of N*9 columns and one single payload section containing an AUG4 formed by byte-wise interleaving of four AUG1s. However for greater clarity a different designation has been selected in FIG. 4a. It should be noted that here merely a different designation has been selected while the actual construction in the exemplary embodiment corresponds to the rules of ITU-T G.707.

As illustrated in FIG. 4a, the STM-4 consists of four byte-wise interleaved frames of the type STM-1. The designation STM-1 was selected to indicate that these are not STM-1 frames, although the STM-1 frames formally correspond to a STM-1 frame in construction and appearance. For clarity the four STM-1s have been illustrated not in interleaved but serial form.

Each of the four STM-1**s consists of an AUG1 and a part of the overhead section of the STM-4. As already stated, the STM-4 contains only one single overhead section consisting of 4*9 columns. However in FIG. 4a this overhead section has been shown split into four equal parts, one quarter of the overhead section in each case being assigned to one STM-1 as overhead of this fictive frame. As the four STM-1s are interleaved byte-wise, the four parts exactly form the actual overhead section of the STM-4.

The overhead section consists of RS-OH, MS-OH and AU-pointer AU-PTR. The designations for each of the overhead sections of the four STM-1s have also been chosen accordingly in FIG. 4a. The overhead section is adjoined by the payload section which, in accordance with the fictive division into four STM-1s, has likewise been shown divided into four parts, one part of the payload section in each case being assigned to one STM-1. Each of the parts of the payload section contains a virtual container VC-4 consisting of a container C4 and a container overhead POH. However, for clarity, and without limiting the generality, in the Figure the containers contained in the payload section have been shown directly adjoining the overhead section of the transport frame, i.e. in the exemplary embodiment the AU-pointers would all be zero. In actuality the VC-4 can be arbitrarily positioned in the payload section of a STM-1 and extend into the payload section of the following frame. This is a basic characteristic of synchronous transport networks (SDH, SONET): Clock differences between individual network elements of the transport network are compensated by AU pointer justification and corresponding displacement of the virtual container.

A STM-1 has 9 rows and 270 columns. The columns 1-9 are occupied by the quarter of the overhead section assigned to the STM-1 while the other columns 10-270 represent the part of the payload section assigned to the STM-1**.

FIG. 4b illustrates the five virtual containers VC-4v of the virtual concatenation VC-4-5v. The upper part of the Figure provides a detailed view of the first virtual container VC-4v#1, while the other four virtual containers have been illustrated in reduced form. In reality however all five virtual containers are of the same length.

Each of the virtual containers is assigned an AU-pointer AU-PTR-v1, ..., AU-PTR-v5 indicating its phase position in the superordinate transport module. VC-4 and AU-pointer represent an AUG1. Since this is a virtual concatenation, all five AU-pointers are determined independently of one another as the five VC-4s can be transmitted in any phase position relative to one another. The column numbers of 1 to 261 are indicated at the upper edge of the VC-4 and the row numbers of 1 to 9 of the AUG are indicated at the right-hand edge.

The first VC-4 commences in column 1 with the POH (path overhead). This is followed by the payload section of the VC-4 in which the overhead sections of the STM-4 to be transported are packed. Columns 2 to 10 contain the overhead section of the first STM-1 from the STM-4, columns 11 to 19 contain the overhead section of the second STM-1, columns 20 to 28 contain the overhead section of the third STM-1, and columns 29 to 37 the overhead section of the fourth STM-1. These are adjoined in columns 38 to 41 by the container overheads POH of the four multiplex units contained in the four STM-1**s. The other columns 42 to 261 are reserved for proprietary or future use by the network management systems of public and private network operator and if they are not used are filled with hexFF. By way of example it has been shown that columns 42 to 50 are reserved for the public operator and columns 51 to 269 for the private operator.

The second VC-4 of the concatenation likewise contains a container head POH#v2. Adjoining the container overhead the first container C4 from the STM-4 frame to be transmitted is attached as payload. Correspondingly, the third VC-4 of the concatenation contains the second container C4 from the STM-4 frame, the fourth VC-4 contains the third container C4 and finally the fifth VC-4 contains the fourth container C4. In this way the entire payload content of the STM-4 frame to be transmitted is distributed between the virtual containers two to five of the concatenation, while all the items of control information from the overhead sections are embedded in the first VC-4.

The corresponding mapping for a transport frame of the type STM-16 to be transmitted from the private network is shown in FIGS. 5a and 5b. The STM-16 to be transmitted consists of 16 byte-wise interleaved STM-1s which each contain a part of the frame overhead comprising RS-OH, MS-OH and AU pointer. These in turn are in each case adjoined by a virtual container of the type VC-4 consisting of a container overhead POH and a payload section C4. Only the first two STM-1 frames and the last, i.e. sixteenth, STM-1** frame have been shown by way of example in FIG. 5a.

FIG. 5b illustrates how this STM-16 frame is packed into a virtual concatenation of seventeen VC-4s. By way of example FIG. 5b shows only the first three VC-4s and the last, i.e. the seventeenth, VC-4 of the concatenation. As in the previous example the first VC-4 contains the frame overheads of the sixteen STM-1 frames of the STM-16 to be transmitted and the container overheads POH of the VC-4s from the STM-16. As in the previous example, the column numbers of the AUG are indicated at the upper edge and the row numbers at the right-hand edge. The AU-pointer consists of nine bytes. In the first column of the AUG the VC-4 commences with its POH. Columns 2 to 10 contain the overhead section of the first STM-1 from the STM-16 to be transmitted, columns 11 to 19 contain the overhead section of the second STM-1** etc. Finally columns 137 to 145 (137=2+15*9) contain the overhead section of the sixteenth STM-1 frame to be transmitted. This is adjoined in columns 146 to 161 by the container overheads POH of the STM-1 to be transmitted. Rows 162 to 261 are reserved for proprietary or future use by the network management systems of public and private network operator and if they are not used are filled with hexFF. By way of example it has been shown that columns 162 to 170 are reserved for the public operator and columns 171 to 261 are reserved for the private operator.

Figure 6:
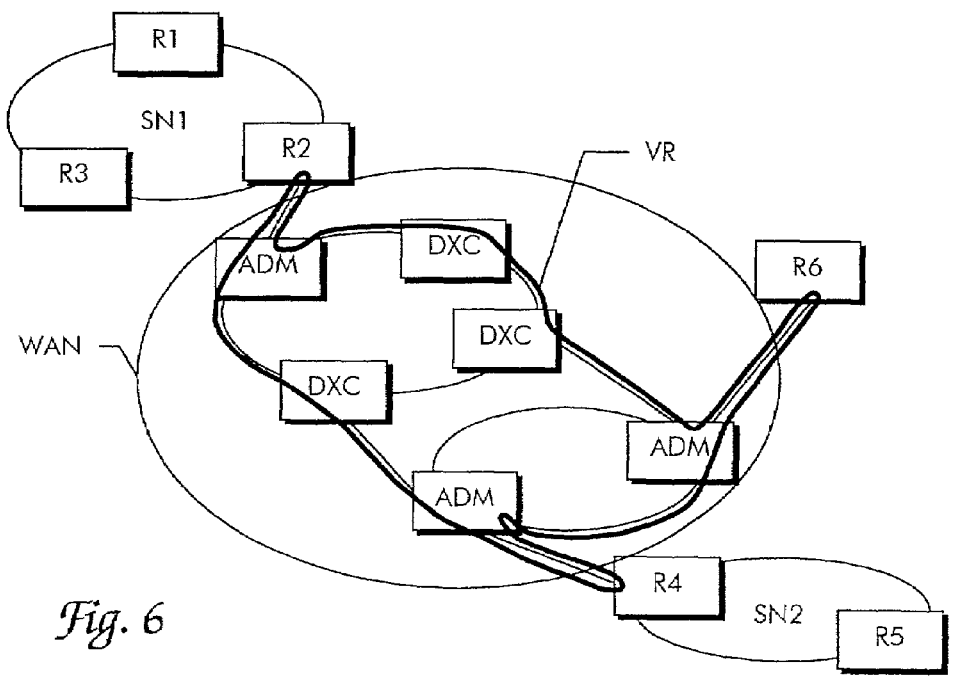
FIG. 6 illustrates the construction of a virtual private network with the arrangement according to FIG. 1.

FIG. 6 schematically illustrates how the transmission of the transport frames between the sub-networks of the private operator takes place via the public transport network. This is based on the same arrangement as in FIG. 1 but the public transport network WAN has been shown in detail. It consists of two ring networks connected to one another at two locations. The ring networks consist of network elements ADM, DXC which are bidirectionally connected to one another. Such network elements are add/drop multiplexers ADM or digital cross-connects DXC. Each of the network elements R2, R4 and R6 of the operator interconnecting the private sub-networks SN1, SN2 via the public transport network WAN are in each case connected to an add/drop multiplexer of the public transport network. By means of these add/drop multiplexers, the transport frames to be transmitted between the sub-networks SN1, SN2 and R6 are packed into a concatenation of virtual containers in accordance with the process already explained in detail, and are transmitted in newly formed transport frames. Between the network elements R2, R4 and R6 this gives rise to a virtual ring network VR via which the multiplex signals structured into STM-4 transport frames are transmitted.

Figure 7:
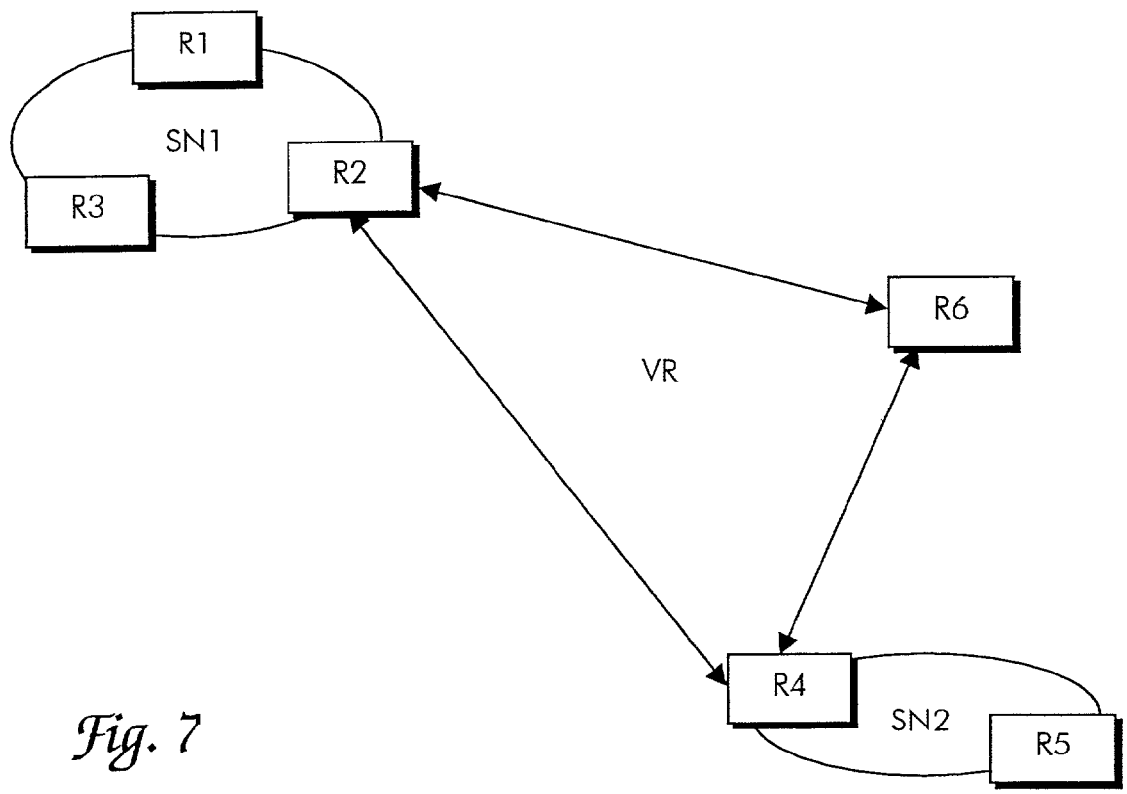
FIG. 7 illustrates the logical construction of the virtual private network according to FIG. 6

For greater clarity FIG. 7 shows a schematic detail view of the virtual ring network VR. As the STM-4 frames are transmitted transparently between the network elements R2, R4 and R6 via the public transport network in that they are treated as payload and packed into a concatenation of virtual containers, for the private network operator this is no different to a direct connection of its network elements. Therefore from the standpoint of the private network operator the network elements R2, R4 and R6 are bidirectionally interconnected to form a ring network. Thus in this virtual ring network in the case of a fault, i.e. when the connection between two of the three network elements fails, it is also possible to switch over to the opposite direction in the ring and thus to re-establish the connection in spite of the failure. A protection circuit of this kind is referred to as MS-SPRING. Proprietary rings and linear MS protection circuits can also be set up.

Figure 8:
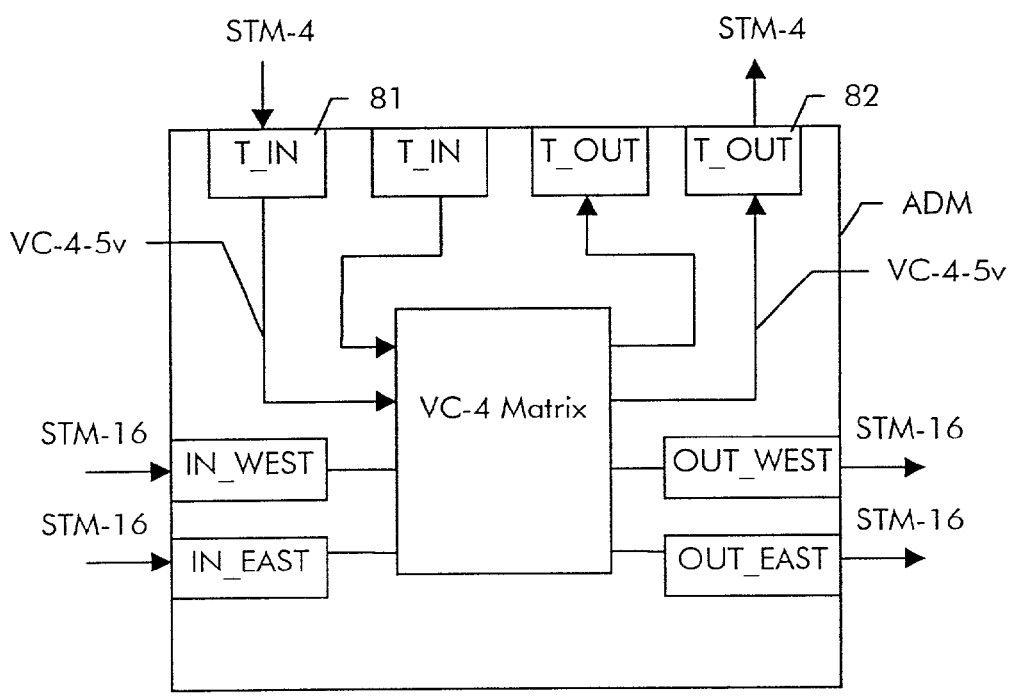
FIG. 8 is a block diagram of a multiplexer according to the invention.

FIG. 8 illustrates a multiplexer ADM with which the transmission process according to the invention can be executed. This is an add/drop multiplexer as used for example in the public transport network WAN in FIG. 6. The multiplexer in each case comprises an east- and a west-input IN_EAST, IN_WEST and an east- and a west-output OUT_EAST, OUT_WEST which are connected to four optical waveguides serving as east- and west lines of a bidirectional SDH ring network. STM-16 frames are received at the inputs and STM-16 frames are transmitted at the outputs. In the inputs the received transport frames are terminated, i.e. their frame overheads are evaluated and the virtual containers of the type VC-4 contained in the frames are forwarded to a central switching matrix (VC-4 matrix). In the outputs new transport frames STM-16 are formed and the virtual containers received from the switching matrix are packed therein. The multiplexer also comprises a number of tributary inputs T_IN and outputs T_OUT via which payload data can be inserted as virtual containers into the ring network (add) or coupled out of the ring network and fed to a connected user (drop).

The switching matrix serves to switch those virtual containers which are not to be terminated in the multiplexer ADM from the west-input to the east-output and from the east-input to the west-output. Virtual containers which are to be terminated by the multiplexer ADM (drop) are switched from the relevant input via the VC-4 matrix to one of the tributary outputs. Payload data which are to be inserted by one of the tributary inputs into the ring (add) are packed in a newly formed virtual container VC-4 in the relevant tributary input and switched via the VC-4 matrix to one of the outputs.

A data stream structured to form STM-4 frames is received at the tributary input 81. In the input 81, in accordance with the mapping described with reference to FIGS. 4*a* and 4*b*, five virtual containers VC-4 are formed for each received STM-4 frame and virtually concatenated to one another. A STM-4 frame is in each case packed into these five VC-4s. The concatenated, five VC-4-5vs are then fed to the VC-4 matrix and fed from the matrix to a corresponding output, e.g. the west-output OUT_WEST where they are interleaved with other VC-4s in the STM-16 frames.

The opposite direction is illustrated by way of example at the tributary output 82. The VC-4 matrix switches to the output 82 a concatenation VC-4-5v of five VC-4s which for example are contained in the STM-16 frame received at the west-input IN_WEST. At the output 82 the useful information of the five VC-4s is read out from the payload sections thereof, intermediately stored in a buffer memory, and assembled in the original phase position to form a STM-4 frame which is then transmitted at the output 82. To assemble the STM-4 frame, the frame overheads packed in accordance with the mapping illustrated in FIG. 4*b* are read out from the first VC-4 and used as frame overheads for STM-1 frames to be newly formed. Then the container heads POH are read out and attached to the containers C4 contained in the payload section of the following four VC-4s. Then the thus newly formed VC-4s are inserted into the STM-1 frames in accordance with the value of the AU-pointer present in the frame overhead and the STM-1 frames are interleaved byte-wise to form a STM-4 frame. The multiplexer ADM thus operates simultaneously as multiplexer and demultiplexer.

The virtual concatenation of VC-4s for the transportation of STM-N frames has been used throughout in the exemplary embodiments. The virtual concatenation provides advantages in the transmission as in interposed network elements no attention need be paid to the phase position of the individual concatenated VC-4s and thus no measures need be taken to suppress differential phase fluctuations between the VC-4s. However it is also possible to use a contiguous concatenation of VC-4s for the transmission according to the invention of STM-N frames. In SONET-based transport networks a concatenation of VC-3s is used instead of the concatenation of VC-4s since, as already mentioned [ . . . ] the VC-4 [ . . . ].

The invention can also be used advantageously internally in network elements in order to switch entire transport frames using a switching matrix designed only for virtual containers. In this case a received transport frame is embedded in a concatenation of virtual containers at the input end whereupon the virtual containers of the concatenation are switched by the switching matrix to an output where they are removed again and the original transport frame is re-assembled. This facilitates the switching of whole transport frames by a matrix which in itself can only switch virtual containers. As a result the frame overhead of the transport frames need not be terminated at the input end and re-generated at the output end.

At least in theory, the process according to the invention can be iteratively interleaved as often as desired, i.e. a first frame-structured synchronous multiplex signal can be transmitted as payload of a first virtual concatenation in a second frame-structured synchronous multiplex signal which in turn is transported as payload of a second virtual concatenation in a third frame-structured synchronous multiplex signal etc.

What is claimed is:

1. A method of transmitting, via a synchronous digital transport network, a frame-structured synchronous multiplex signal, composed of frames having a payload section and an overhead section, wherein the payload section comprises multiplex units that are multiplexed according to a multiplex hierarchy, wherein the method comprises transmitting a frame of the frame-structured synchronous multiplex signal to be transmitted, including its unchanged overhead section, as payload in a concatenation of newly formed multiplex units.

2. The method according to claim 1, wherein the method further comprises:
   creating a number of new multiplex units of the same size, and concatenating these new multiplex units to form a virtual concatenation,
   packing the frame, including the overhead section thereof, in payload sections of the concatenated new multiplex units,
   creating at least one new frame and embedding the concatenated new multiplex units in the payload section thereof, and
   transmitting the at least one new frame via the synchronous transport network.

3. The method according to claim 1, wherein the synchronous transport network is a SDH network, wherein the frames are synchronous transport modules of the type STM-N where N=1, 4, 16 or 64, and wherein the multiplex units are virtual containers of the type VC-N where N=11, 12, 2, 3, or 4 or contiguously concatenated virtual containers of the type VC-4-Nc where N=4 or 16, and wherein the newly formed multiplex units are virtual containers of the type VC-N where N=3 or 4.

4. The method according to claim 1 wherein, in a first of the newly formed multiplex units, the overhead section of a frame to be transmitted and path overheads of the multiplex units contained in the payload section of this frame are combined, and wherein one of the multiplex units from the payload section of this transport frame without the path overhead thereof is inserted into each of the remaining newly formed multiplex units of the concatenation.

5. The method according to claim 1, wherein a frame of the type STM-1, OC-3 or OC-3-3c is transported via two virtually concatenated virtual containers of the type VC-4 or via four virtually concatenated virtual containers of the type VC-3.

6. The method according to claim 1, wherein a frame of the type STM-4, OC-12 or OC-3-12c is transported via five virtually concatenated virtual containers of the type VC-4 or thirteen virtually concatenated virtual containers of the type VC-3.

7. The method according to claim 1, wherein a frame of the type STM-16, OC-48 or OC-3-48c is transported via seventeen virtually concatenated virtual containers of the type VC-4 or via fifty-one virtually concatenated virtual containers of the type VC-3.

8. The method according to claim 1, wherein a frame of the type STM-64, OC-192 or OC-3-192c is transported via sixty-eight virtually concatenated virtual containers of the type VC-4.

9. A multiplexer for a synchronous digital transport network comprising:

at least one tributary input for receiving a first frame-structured synchronous multiplex signal comprising first frames each having a payload section and an overhead section, wherein the payload section comprises multiplex units that are multiplexed according to a multiplex hierarchy, a multiplex device, connected to the tributary input, for creating new multiplex units for concatenating the newly formed multiplex units to form a concatenation, and for packing a received frame, including the unchanged overhead sections thereof, as payload in the concatenation of the newly formed multiplex units, and at least one output for creating and transmitting a second, framed-structured synchronous multiplex signal comprising second frames in whose payload sections the concatenated, newly formed multiplex units are inserted.

10. The multiplexer according to claim 9, further comprising a switching matrix for selectively switching of multiplex units, wherein the multiplex device is connected to a matrix input and the output is connected to a matrix output.

* * * * *

UNITED STATES PATENT AND TRADEMARK OFFICE
CERTIFICATE OF CORRECTION

PATENT NO. : 7,586,921 B2 Page 1 of 1
APPLICATION NO. : 09/863321
DATED : September 8, 2009
INVENTOR(S) : Volkmar Heuer It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2393 days.

Signed and Sealed this

Twenty-first Day of September, 2010

David J. Kappos
*Director of the United States Patent and Trademark Office*